Sept. 20, 1932. G. W. WIARD 1,878,219
LIFTING JACK
Filed Nov. 1, 1926 3 Sheets-Sheet 3
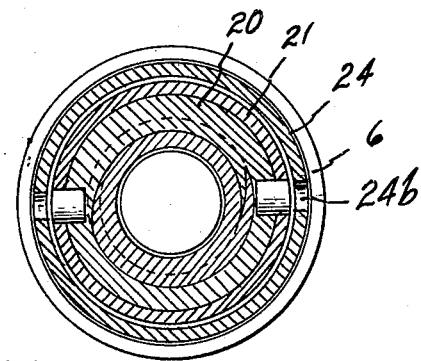
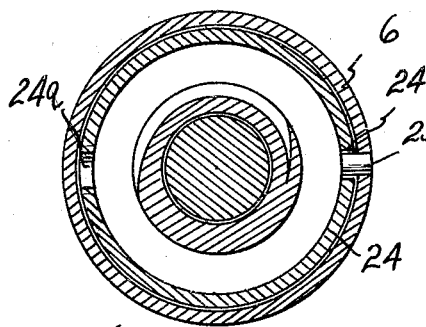
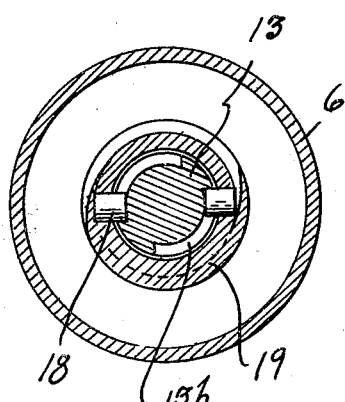
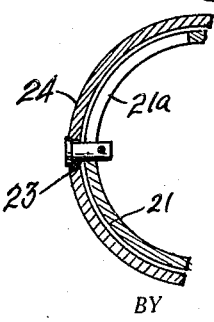
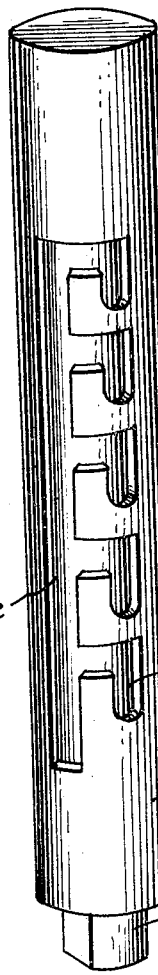
INVENTOR.
George W. Wiard
BY Rex Frye
ATTORNEY.

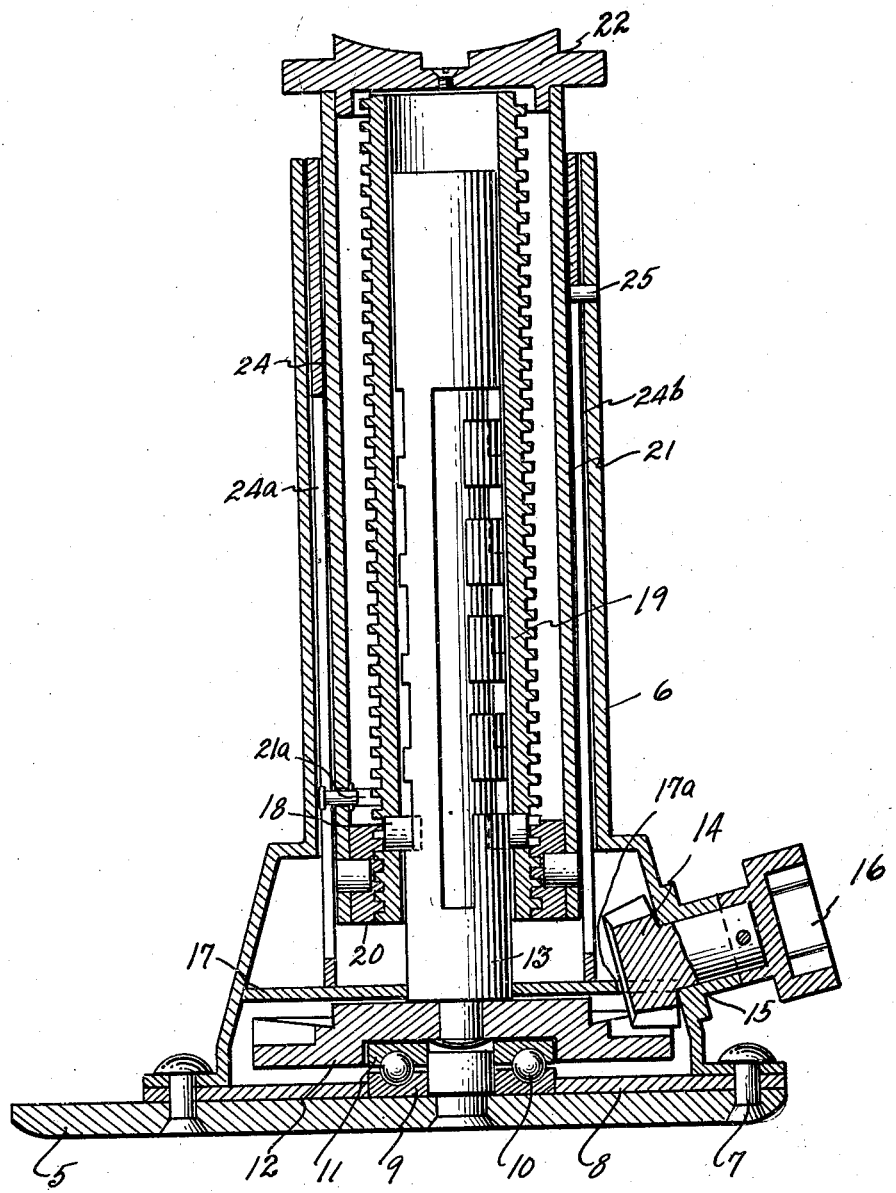

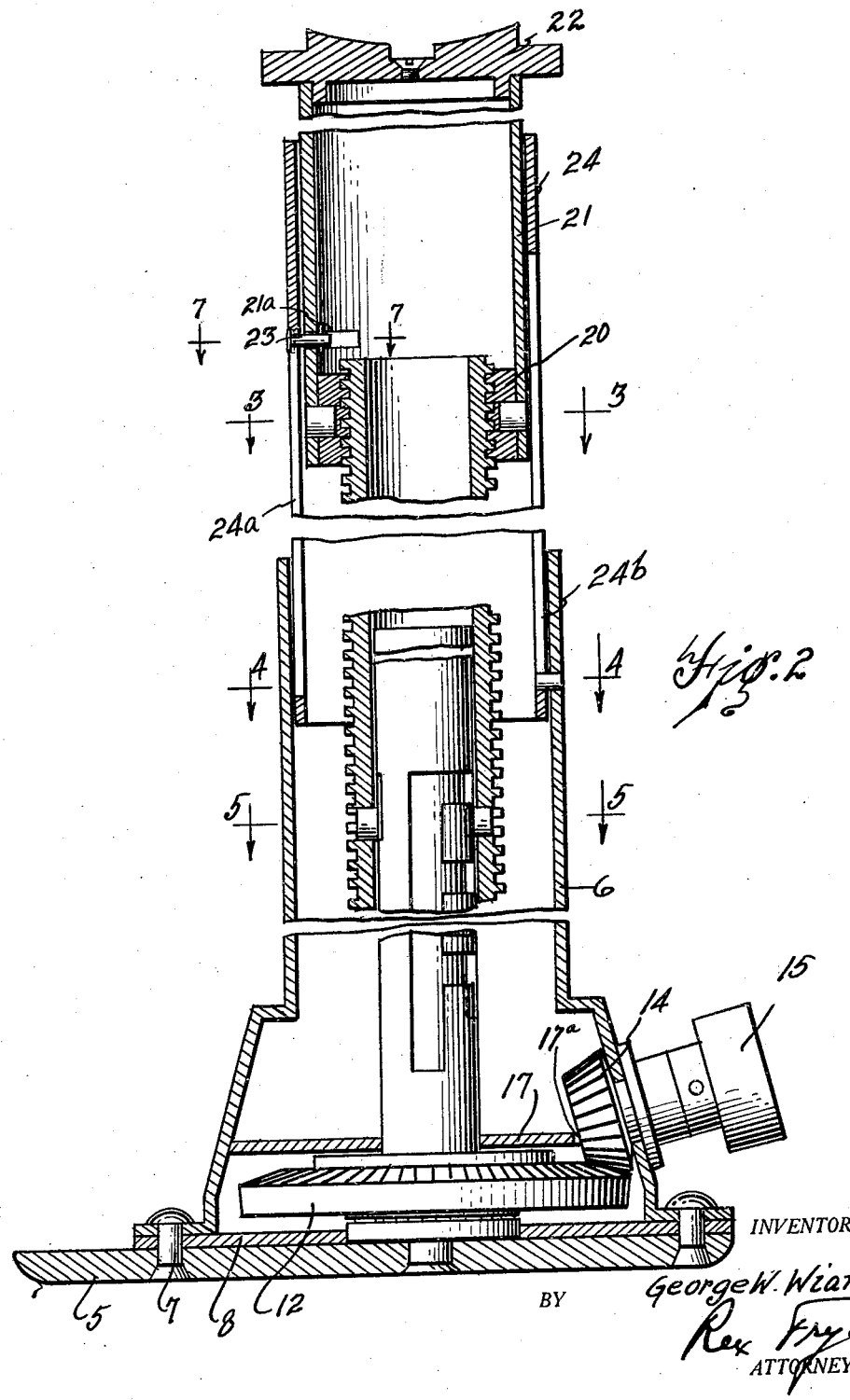

Patented Sept. 20, 1932

1,878,219

UNITED STATES PATENT OFFICE

GEORGE W. WIARD, OF DETROIT, MICHIGAN, ASSIGNOR, BY DIRECT AND MESNE ASSIGNMENTS, TO THE BUCKEYE JACK MANUFACTURING COMPANY, OF ALLIANCE, OHIO, A CORPORATION OF OHIO

LIFTING JACK

Application filed November 1, 1926. Serial No. 145,430.

This invention relates to lifting jacks, and is particularly designed for lifting one extremity of an automobile axle, as when a punctured tire is to be removed from a vehicle wheel.

It has long been a desideratum among engineers and automobile manufacturers to provide a jack having an initial height low enough to permit the ready insertion of the jack under one extremity of the vehicle axle when a tire of comparatively large diameter is deflated and yet have a sufficient travel of the jack-seat to permit the elevation of such extremity of the axle a sufficient distance to permit the ready application of a replacement tire after the axle has been raised. For example, when a balloon tire of say six inch diameter has become flat, lowering the adjacent end of the vehicle axle, it is necessary to elevate the end of the axle approximately seven inches, and when the vehicle is resting upon a soft or rutty road it may be necessary to secure even further travel of the jack-seat to compensate for unevenness in road surface or sinking of the jack base because of the weight of the car. One of the objects of my invention is the provision of a jack having a comparatively low minimum height and a comparatively long travel of the jack-seat while affording sufficient support for the lifted member at all heights of the jack-seat.

Another object of my invention is the construction of a lifting jack with a plurality of telescoping tubular members for both lifting and preventing rotation of the jack-seat during its travel.

A further object of my invention is the arrangement of a hollow threaded cylinder around a fixed spindle with provisions for adjusting the initial position of the cylinder upon the spindle, whereby rapid rough adjustment of the jack-seat may be secured, followed by a slower final adjustment of the jack-seat due to the joint rotation of the spindle and threaded cylinder.

Other objects and advantages will be apparent from the following description, wherein reference is made to the accompanying drawings illustrating a preferred embodiment of my invention and wherein similar reference numerals designate similar parts throughout the several views.

In the drawings:

Fig. 1 is a vertical sectional view through my improved jack, the parts being shown in their lowermost positions.

Fig. 2 is a similar view showing the positions assumed when the jack-seat has been elevated.

Figs. 3, 4 and 5 are detail sectional views taken respectively on the lines 3—3, 4—4 and 5—5 of Fig. 2.

Fig. 6 is a detail perspective view showing the vertical spindle utilized herein.

Fig. 7 is a detail sectional view taken substantially on the line 7—7 of Figure 2.

Referring now to the drawings, the numeral 5 designates the jack base, which may be of any desired shape or size, and which carries the outer casing 6 adapted to enclose the working parts of the jack. The casing 6 is herein shown as comprising an upper tubular barrel supported upon an enlarged lower compartment having a flange whereby the casing 6 may be secured upon the base 5, as by rivets 7. A reinforcing plate 8 centrally apertured to provide a seat for the lower race 9 of a ball bearing may also be secured to the base 5 by the rivets 7, or in other desired manner. A circumferential series of balls 10 is adapted to rest upon the race 9 and support an upper race 11 suitably arranged to rotate with a horizontal gear 12, fixed upon the lower reduced extremity 13$^a$ of the vertical spindle 13 (note Fig. 1). The gear 12 meshes with a pinion 14 journaled in a bearing 15 carried by the enlarged lower portion of the casing 6 and adapted to be suitably connected with a junction member 16 whereby a handle of appropriate length and design may be readily secured. This arrangement of parts enables the rotation of the vertical spindle 13 whenever the pinion 14 is rotated in either direction, and any desired speed of rotation of the spindle may be secured by varying the number of teeth upon the pinion 14 and gear 12. To enable the retention of suitable lubricant around the ball bearing and gear 12, I preferably provide a cover plate 17 above the gear 12 adapted to substantially close the space around the gear and ball bearing except for a slot 17ª for the admission of the pinion 14. The ball bearing and gear can then be packed with solid or semi-solid lubricant, which will be retained below the cover plate 17 for indefinite periods.

The spindle 13 is suitably formed with a plurality of spaced bayonet slots 13ᵇ with their upper portions opening into an elongated vertical groove 13ᶜ (note Figs. 1 and 6). These bayonet slots are adapted to receive inwardly extending diametrically opposed pins 18 carried by the hollow externally screw threaded cylinder 19, and when the pins 18 are seated within any of the bayonet slots 13ᵇ the hollow screw 19 will be rotated simultaneously with the spindle 13. However, the construction permits the adjustment of the initial position of the hollow screw 19 upon the spindle 13 preparatory to the simultaneous rotation of such members, whereby it is possible to quickly adjust the jack-seat hereinafter referred to, by a direct manual movement so that the seat will almost touch the part to be raised, whereupon the spindle and hollow screw may be rotated to bring the jack-seat into engagement with the member to be lifted, and upon further turning movement to lift such member to the desired height.

The hollow screw 19 threads into the traveler nut 20 fitted into one extremity of the inner tubular member 21 which at its upper extremity carries the jack-seat 22 (note Fig. 1). The inner tubular member 21 is normally held against rotation, as hereinafter described, and the rotation of the hollow screw 19 will serve to vertically move the traveler nut 20 and attached parts according to the direction of rotation of the screw. Partial rotation of the inner tubular member 21 together with the hollow screw 19 is permitted, however, to enable the adjustment of the screw 19 upon the spindle 13. To this end a horizontal slot 21ª is formed in the periphery of the hollow tubular member 21 and receives the inner portion of a pin 23, the outer portion of which passes through the elongated vertical slot 24ª in the intermediate tubular member 24 (note Figs. 1 and 2). The pin 23 is headed at its outer portion to prevent its accidental passing through the slot 24ª, and receives a cotter pin or the like at its inner extremity to prevent it from accidentally slipping through the horizontal slot 21ª. By virtue of this construction the jack-seat 22 may be grasped and raised to first elevate the pins 18 to the uppermost portions of the bayonet slots 13ᵇ wherein they then rest, and then turned to bring the pins 18 out of such bayonet slots and into the vertical slots 13ᶜ connecting the several bayonet slots. During such raising movement the pin 23 moves vertically in the elongated slot 24ª of the intermediate tubular member 24, while on such rotative movement the inner tubular member 21 moves relatively to the pin 23 because of the horizontal slot 21ª. Then the jack-seat and attached parts may be elevated or lowered as desired to any desired bayonet slot 13ᵇ, whereupon it is reversely rotated to bring the pins 18 into the upper horizontal portions of the desired bayonet slots and then lowered into the vertical seats of such bayonet slots.

The spindle 13 may then be rotated through the gears 12 and 14 to turn the hollow screw 19 in the desired direction, the movement of the screw 19 serving to advance or retract the traveler nut 20 together with the inner tubular member 21 and jack-seat 22. The pin 23 moves vertically within the elongated slot 24ª in the intermediate tubular member 24 until it contacts the upper wall of such slot, whereupon further upward travel of the inner tubular member 21 will serve to also raise the intermediate member 24. Rotation of the intermediate member 24 is prevented by the pin 25 secured in the casing 6 and fitting within the elongated vertical slot 24ᵇ in the intermediate member 24 (note Fig. 2).

When it is desired to again lower the jack-seat it is only necessary to turn the pinion 14 in the reverse direction, the rotation of the hollow screw 19 serving to simultaneously lower the inner tubular member 21 and intermediate tubular member 24 until the pin 25 in the outer casing engages the upper wall of the slot 24ᵇ, whereupon the inner tubular member 21 only travels, its pin 23 moving within the elongated slot 24ª. The simplicity and practicability of my improved jack is believed to be apparent. The hollow screw 19 is positively driven in either direction through the vertical spindle 13, and the rotation of the screw serves to directly advance or retract the traveler nut 20 and the jack-seat securely attached thereto. The supporting members are preferably tubular in shape and give great strength with comparatively little weight. Moreover, initial adjustment of the jack-seat to any desired height can be readily effected.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim

1. A device of the character described including a tubular outer casing, a tubular inner member adapted to telescope therein, and connected thereto for partial rotation relatively to the casing, a traveler nut and jack-seat carried by the inner member, a hollow screw threaded in the nut, a vertical spindle extending into said hollow screw, means for driving said spindle, and means for adjustably connecting the spindle and screw for simultaneous rotation.

2. A device of the character described including a tubular outer casing, a tubular inner member adapted to telescope therein, and connected thereto for partial rotation relatively to the casing, a traveler nut and jack-seat carried by the inner member, a hollow screw threaded in the nut, a vertical spindle extending into said hollow screw, means for driving said spindle, and means for adjustably connecting the spindle and screw for simultaneous rotation, including inwardly directed pins carried by said screw and spaced projections on the spindle adapted to engage said pins.

3. A device of the character described including a tubular outer casing, an intermediate tubular member, a tubular inner member adapted to telescope therein, and connected thereto for partial rotation relatively to the casing, a traveler nut and jack-seat carried by the inner member, a hollow screw threaded in the nut, a vertical spindle extending into said hollow screw, means for driving said spindle, and means for adjustably connecting the spindle and screw for simultaneous rotation, including inwardly directed pins carried by said screw and spaced projections on the spindle adapted to engage said pins.

4. A jack including a base, a tubular casing having an enlarged lower portion, a horizontal gear journaled in said enlarged lower portion, means for driving said gear extending through the casing, a vertical spindle fixed centrally of said gear and having a plurality of bayonet slots therein, a hollow screw surrounding said spindle and carrying a radial pin adapted to enter any of said bayonet slots, a traveler nut threaded upon said screw, an inner member secured upon said traveler nut and carrying a jack-seat, and connections between the inner member and casing whereby said inner member may be partially rotated relatively to said casing.

5. A jack including a base, a tubular casing having an enlarged lower portion, a horizontal gear journaled in said enlarged lower portion, means for driving said gear extending through the casing, a vertical spindle fixed centrally of said gear and having a plurality of bayonet slots therein, a hollow screw surrounding said spindle and carrying a radial pin adapted to enter any of said bayonet slots, a traveler nut threaded upon said screw, an inner member secured upon said traveler nut and carrying a jack-seat, an intermediate member arranged between said inner member and the upper portion of said casing, and connections between the inner member and casing whereby said inner member may be partially rotated relatively to said intermediate member.

6. A jack including a base, a tubular casing having an enlarged lower portion, a horizontal gear journaled in said enlarged lower portion, means for driving said gear extending through the casing, a vertical spindle fixed centrally of said gear and having a plurality of aligned pairs of bayonet slots therein, a hollow screw surrounding said spindle and carrying a pair of diametrically opposed radial pins adapted to enter any of said pairs of bayonet slots, a traveler nut threaded upon said screw, an inner member secured upon said traveler nut and carrying a jack-seat, and connections between the inner member and casing whereby said inner member may be partially rotated relatively to said casing.

7. A jack including a base, a tubular casing having an enlarged lower portion, a horizontal gear journaled in said enlarged lower portion, means for driving said gear extending through the casing, a vertical spindle fixed centrally of said gear and having a plurality of aligned pairs of bayonet slots therein, a hollow screw surrounding said spindle and carrying a pair of diametrically opposed radial pins adapted to enter any of said pairs of bayonet slots, a traveler nut threaded upon said screw, an inner member secured upon said traveler nut and carrying a jack-seat, an intermediate member arranged between said inner member and the upper portion of said casing, and connections between the inner member and casing whereby said inner member may be partially rotated relatively to said intermediate member.

8. In a jack, a tubular outer casing carrying an inwardly extending radial pin, an intermediate tubular member adapted to telescope within the outer casing and having a pair of longitudinal slots therein, one of which slots receives said radial pin of the outer casing, an inner tubular member adapted to telescope within said intermediate member and having a horizontal slot formed in its periphery, a pin loosely mounted in said horizontal slot of the inner member and one of the longitudinal slots of the intermediate member, a traveler nut and jack-seat carried by said inner member, a hollow screw threaded within the traveler nut, a vertical spindle extending within said hollow screw, means for adjustably connecting the spindle and screw for simultaneous rotation, and means for driving the spindle.

9. In a jack, a tubular outer casing carrying an inwardly extending radial pin, an intermediate tubular member adapted to telescope within the outer casing and having a pair of longitudinal slots therein, one of which slots receives said radial pin of the outer casing, an inner tubular member adapted to telescope within said intermediate member and having a horizontal slot formed in the periphery, a pin loosely mounted in said horizontal slot of the inner member and one of the longitudinal slots of the intermediate member, a traveler nut and jack-seat carried by said inner member, a hollow screw threaded within the traveler nut, a vertical spindle extending within said hollow screw, means for adjustably connecting the spindle and screw for simultaneous rotation, means for driving the spindle, including a horizontal gear fixed upon the spindle, a pinion journaled in the casing and meshing with said gear, and means for rotating said pinion.

10. In a jack, a vertical spindle having a vertical peripheral slot therein and a plurality of spaced bayonet slots opening into said vertical slot, means for rotating said spindle in either direction, a hollow screw threaded cylinder arranged over the spindle and having an inwardly extending radial pin adapted to fit in any of said slots in the spindle, a traveler nut threaded upon said cylinder, an inner telescoping member secured to the traveler nut and carrying a jack-seat, an outer telescoping member surrounding said inner member, a casing exterior of said outer member and connections between the inner member and casing whereby said inner member may be partially rotated relative to said outer member.

11. A device of the character described including a tubular outer casing, a tubular inner member and an intermediate tubular member adapted to telescope therein and slidably but non-rotatably connected to the outer casing, and connection between the intermediate and inner tubular members adapted to permit partial rotation of the latter relatively to the casing, said connection comprising a pin carried by one member and a cooperating slot formed in the other, a traveler nut and jack-seat carried by the inner member, a hollow screw threaded in the nut, a vertical spindle extending into said hollow screw, means for driving said spindle, and means for adjustably connecting the spindle and screw for simultaneous rotation.

In witness whereof I hereunto set my hand.

GEORGE W. WIARD.